July 8, 1947.　　　D. P. COOPER, JR　　　2,423,583
PROCESS OF FORMING HARD RESINOUS SURFACES ON
ORGANIC PLASTICS, AND PRODUCT THEREOF
Filed Oct. 20, 1941
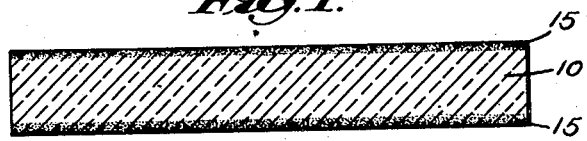
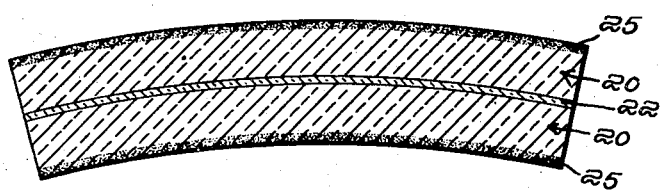
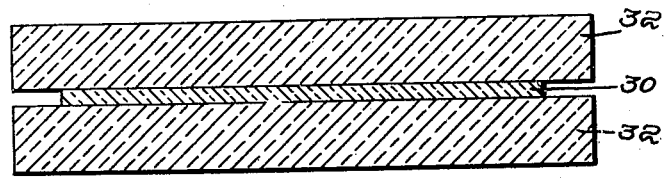
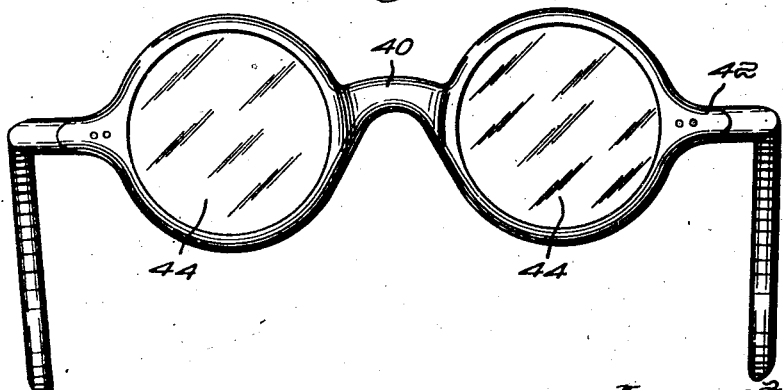
Inventor:
Dexter P. Cooper Jr.
By Donald L. Brown
Attorney Patented July 8, 1947

2,423,583

UNITED STATES PATENT OFFICE 2,423,583

PROCESS OF FORMING HARD RESINOUS SURFACES ON ORGANIC PLASTICS, AND PRODUCT THEREOF

Dexter P. Cooper, Jr., Boston, Mass., assignor to Polaroid Corporation, Dover, Del., a corporation of Delaware Application October 20, 1941, Serial No. 415,676

8 Claims. (Cl. 88—57)

This invention relates to a new and improved process for forming hard surfaces on relatively soft organic plastics and resins and to the product of said process.

An object of the invention is to provide a process for hardening the surface of a relatively soft organic plastic by introducing into said surface a polymerizable plastic and polymerizing the same in situ in said surface.

Further objects of the invention are to provide a process of the character described wherein the polymerizable plastic is introduced into the surface to be hardened in conjunction with a solvent or swelling agent for the plastic comprising the said surface; to provide a process wherein the said swelling agent or solvent comprises a polymerizable plastic or resin which, when polymerized, is harder than the plastic for which it is used as a solvent or swelling agent; to provide a process of the character described wherein the material employed to harden the surface comprises a mixture of polymerizable plastics; to provide a process of the character described wherein the plastics comprising said mixture are in the monomeric state when incorporated in the said surface to be hardened; to employ a catalyst to accelerate the polymerization of the plastic or plastics employed in the process; to provide a method for forming hard, optically smooth surfaces cheaply and easily on articles formed of a softer organic plastic; and to provide a method or methods of the character described in connection with the provision of hard, optically smooth surfaces on light-polarizing sheets or films.

A still further object of the invention is to provide new articles formed by means of the above processes and more particularly hard surfaced, transparent sheets and lenses formed of organic plastic materials.

A still further object of the invention is to provide sunglasses, particularly polarizing sunglasses, having plastic lenses formed in accordance with the present invention.

Other objects and advantages will in part appear and in part be pointed out in the course of the following detailed descriptions of certain embodiments of the invention, which are given as non-limiting examples, in connection with the accompanying drawings, in which:

Figure 1 is a diagrammatic view in section of a sheet or similar article formed from an organic plastic and having optically smooth surfaces thereon produced by means of the process of the invention;

Fig. 2 is a similar view showing a molded plastic lens comprising light-polarizing means and having hard, optically smooth surfaces formed thereon by means of the process of the invention;

Fig. 3 is a diagrammatic view showing simple means for practicing the process of the invention to produce a product such as that shown in Fig. 1; and Fig. 4 is an elevational view of a pair of sunglasses embodying plastic lenses formed in accordance with the present invention.

The present invention is particularly adapted for use in the preparation of relatively hard and preferably optically smooth surfaces comprising relatively small amounts of polymerized, hard, preferably transparent plastics, on materials made of less expensive, more easily worked and more readily available organic plastics, such for example as the cellulosic plastics. Cellulose acetate, for example, is admirably adapted to be molded or otherwise formed into a wide variety of devices and more particularly into thin sheets or films adapted for use as lenses, windows and the like. Articles formed of cellulose acetate possess the disadvantage of a relatively soft and easily scratched surface and although the material is relatively cheap, readily available and easily worked, its use, especially when unprotected, has been restricted because of its softness. It is a principal object of this invention to provide a method for hardening the surfaces of lenses, sheets and other devices made of materials such as cellulose acetate and other relatively soft organic plastics by incorporating in the surface layers of the articles made of such plastics other polymerizable organic plastic materials which are then polymerized in situ.

The polymerizable resins or plastics are preferably introduced into the surface layers of the softer plastic article by swelling or softening the surface of the said article, for example by applying thereto a solvent or swelling agent for the organic plastic forming the article. As the surface is suitably softened or swelled the polymerizable plastic, preferably in monomeric form, is introduced into the softened surface which it penetrates. This is preferably done at the time the solvent or swelling agent is applied to the surface and under these circumstances it is desirable that the solvent or swelling agent and the polymerizable monomer be miscible or compatible.

In a preferred embodiment of the invention the solvent or swelling agent employed is itself a polymerizable monomer which is subsequently, and simultaneously with the other plastic or plastics employed, polymerized in situ on and in the surface layers of the article being treated, to provide a relatively hard and preferably transparent surface thereon.

In certain embodiments of the invention it may be found desirable to employ compatible mixtures of two or more polymerizable plastics which may be selected so that the resulting polymerized product may be hard and tough and so that the mixed monomers may be readily and rapidly introduced into the surface layers of the article being treated. To this end, the mixture may comprise a resin or plastic which is exceedingly hard when polymerized, for example allyl methacrylate, a plastic which is tougher and less brittle when polymerized, for example methyl methacrylate, and a polymerizable monomer, for example methacrylic acid monomer, which may act primarily to speed up the penetration of the sheet or other article treated by the polymerizable plastics employed.

If it is desired to impart to the finished product optically smooth surfaces, the polymerization of the plastics introduced into the surface layers of the treated article may be carried forward between optically smooth press polishing plates, for example plates of optically smooth glass. The characteristics of the surfaces of the finished polymerized product will be those of the surfaces of the plates against which the polymerization has taken place.

Fig. 1 represents a product of the present invention, 10 representing the sheet or other article of the relatively soft, preferably transparent, organic plastic material which has been treated in the manner aforesaid and which may, for example, be cellulose acetate, cellulose acetate butyrate, some other cellulosic material and many other materials, for example any linear polymeric plastic. The stippled portions 15 represent the surface layers of the treated article, the stippling indicating the presence in the surface layers of polymerized organic plastics which impart to the surface layers a toughness and hardness not found in the material 10. In one form of the invention, for example, stippling 15 may represent the product of the polymerization of the mixture of the monomers of allyl methacrylate, methyl methacrylate, and methacrylic acid previously described. It has already been noted that the allyl methacrylate is employed to impart extreme hardness, the methyl methacrylate to harden and toughen the surface, and the methacrylic acid to expedite the penetration by the other two plastics of the surface of the material 10. A suitable mixture for use in the process of the present invention may comprise, for example, equal parts by volume of allyl methacrylate monomer and methyl methacrylate monomer with a relatively small amount, for example one-fourth, of methacrylic acid monomer. It will, of course, be understood that these proportions are not critical and it will further be understood that it is not necessary to use a mixture of these three monomers. If, for example, an exceedingly hard surface is desired and if brittleness is not objectionable, the relative percentage of allyl methacrylate employed may be greatly increased. In fact, a mixture of allyl methacrylate and methacrylic acid monomer may prove satisfactory. So also, if a somewhat less hard, but tough surface is desired, the allyl methacrylate may be dispensed with and the methyl methacrylate-methacrylic acid monomer mixture may be employed.

It will be understood, furthermore, that the methacrylic acid monomer may be dispensed with under certain conditions and where rapid penetration is not important and the surface of the treated sheet may be swelled or wetted directly as for example by methyl methacrylate which may then be polymerized in situ after it has penetrated the surface layers of the treated plastic. Such a process is, of course, considerably slower and hence is not preferred.

While the swelling agent or solvent heretofore mentioned has been described as one which will polymerize in situ with the other monomers used in the process, it is not necessary that such a swelling agent be used. Satisfactory results may, for example, be obtained by the use of a solvent such as acetone or acetic acid. If it is desired to form a hard surface on a cellulose acetate sheet or other article, for example, a mixture of acetone and allyl methacrylate monomer may be used, sufficient acetone being employed to soften the cellulose acetate sufficiently to permit rapid penetration thereof by the allyl methacrylate monomer. When solvents or swelling agents of this type are employed it will be understood that evaporation of the solvent takes place during and after the subsequent polymerization of the hardening material employed.

Many additional polymerizable plastic materials may be employed in the process of the present invention. Examples of materials which may be employed without the use of other solvents or swelling agents where cellulose acetate articles are to be treated are methyl vinyl ketone and methyl isopropenyl ketone, in addition to methacrylic acid. Cyclohexyl methacrylate should also be mentioned as a particularly suitable material for use in the practice of the present invention where the hardening of the surface of a cellulosic product is desired. Under certain circumstances, moreover, polymers including three-dimensional polymers may be used.

In Fig. 2 a second modification of the invention is shown as comprising a pair of sheets 20 of cellulosic material, for example cellulose acetate, having bonded therebetween a sheet 22 of a light-polarizing plastic material. Sheet 22 may comprise, for example, a suspension of light-polarizing particles oriented to substantial parallelism in a transparent plastic carrier, or one of the other light-polarizing materials sold commercially under the trade name "Polaroid." The hardened outer surfaces of the product shown in Fig. 2 are illustrated at 25. Such a product may, as is shown in Fig. 2, be formed as a lens. It may be molded in a curved form and its outer surfaces may be of such hardness as to permit its use as an eyeglass lens without the protection of additional glass cover plates.

It has heretofore been found desirable to protect the surfaces of plastic polarizing sheets and films with glass and five-ply laminations comprising two sheets of glass, two layers of adhesive and a centrally disposed light-polarizing layer have been commonly used in sunglasses and the like. The three-ply lamination shown in Fig. 2 as a product of the present invention and comprising the three plastic layers with the hard polymerized outer surfaces may be produced much more cheaply than the laminations heretofore used in the art, and the surface hardness of the products of the present invention is such as to permit their use for long periods of time in sunglasses and the like. Such a finished sunglass is shown for example in Fig. 4 as comprising a frame 40, temples 42 and a pair of plastic polarizing lenses 44 of the type shown in Fig. 2.

While the product of the present invention and the process thereof have been described primarily in connection with its applicability to the surfacing of sheets of cellulosic material such as cellulose acetate, it is to be understood that other plastics and resins may be employed as the treated material. It may, for example, be desirable to harden the surface layers of a methyl methacrylate product by incorporating therewith allyl methacrylate. The present invention is admirably adapted for use in the production of such a product.

It has already been pointed out that the treated sheet or article may comprise any transparent organic plastic which may be softened or dissolved by the application thereto of a wetting agent or solvent which is miscible with a polymerizable organic plastic which may thus be introduced into the surface layers of the product being treated.

Under certain circumstances and particularly where the polymerization of the monomers introduced into the surface of the treated plastic is to be carried forward at relatively low temperatures, for example where the process of the present invention is employed in the production of devices such as that shown in Fig. 2 which comprise light-polarizing material, a catalyst may preferably be added to the monomers introduced into the surface of the treated product. In the preferred embodiment of the invention where a mixture of methyl methacrylate monomer, allyl methacrylate monomer and methacrylic acid monomer is employed, a small amount of benzoyl peroxide may be used as a catalyst to accelerate the polymerization of the mixture of plastics. Where, for example, approximately 100 cc. of the plastic mixture is used, from one to two grams of the catalyst has been found adequate.

In preparing the mixture of monomers for use in the process of the present invention it has been found desirable to subject the monomers to what may be termed an incubation period. The mixture may, for example, be heated for from ten to fifteen minutes at 150° F. before being applied to the surface of the sheet or other article to be treated. This pre-heating serves to prepare the monomers for rapid polymerization. It is to be understood that substantially no polymerization takes place during this period of incubation and in fact this treatment may be completely dispensed with. Where it is employed, only a very small amount of the catalyst, for example one-tenth of a gram in the formula above referred to, should be introduced into the monomer mixture prior to the termination of the period of incubation. The remainder of the catalyst may then be added after the mixture has been cooled and before it is applied to the surface being treated.

The process of the present invention may be practiced in various ways. The article to be treated, for example the sheet or lens of cellulose acetate, may be soaked for a short time, for example from five to thirty minutes, in the mixture of monomers and the swelling agent employed. The period of soaking may determine the depth of penetration of the monomer mixture. The treated article may then be removed from the mixture, placed between press polishing plates under such pressure as to cause its softened outer surfaces to conform to the surfaces of the plates, and the polymerization of the plastics introduced into the surface of the sheet may then be carried forward, for example by the application of heat or in other ways known to the art such, for example, as by the use of ultra-violet radiation.

It has been found necessary in many cases to soak or imbibe the treated sheet in the mixture of monomers which impregnate its surface. Satisfactory results have frequently been obtained if the surfaces of the treated sheet are sprinkled or otherwise wetted with the monomer and swelling agent employed. The wetted sheet may then be placed between the press polishing plates or not, as desired, and polymerization effected in the manner previously described. In this embodiment of the process the penetration of the surface layers is somewhat less than when the treated sheet is soaked or imbibed in the monomer.

Fig. 3 represents apparatus for practicing the process of the present invention. The plastic sheet 30, which has been wetted or swelled by the monomer or monomer mixture employed, is placed between the two press polishing plates of glass 32 and pressure applied to insure conformation of the surfaces of the sheet 30 to the surfaces of the glass plates 32.

The time and temperature necessary to effect polymerization will vary widely, depending upon the materials used. With the preferred formula of the invention, heating for approximately one-half hour to one hour at a temperature of 150° F. has proved satisfactory. When the polymerization is completed, the assembly should be permitted to cool, but it has been found desirable to separate the glass plates 32 from the sheet 30 while the assembly is still warm, for example at a temperature of about 140° F. It should be pointed out that the process of the present invention may advantageously be practiced on a plurality of plastic sheets simultaneously by forming, for example, a structure of alternate sheets 30 and press polishing plates 32 and placing the assembly between suitable pressure elements and then polymerizing the monomer introduced into the treated sheets.

As shown in Figs. 1 and 2 the product of the present invention is an article the outermost surface layers of which comprise essentially a hard polymerized plastic. This hard polymerized plastic penetrates to a greater or less extent into the layers of the treated article adjacent the surface and those layers are made up of varying quantities of the polymerized plastic and the material of the treated sheet or other article. The greater the distance from the surface layer the less the proportion of polymerized plastic. The penetration need not be extensive. It should, however, be such that the polymerized material cannot properly be called a coating, and by this it is meant that the polymerized material may not be stripped from treated plastic but rather enters physically into the body of the treated plastic much for example in the way a viscous liquid enters into blotting paper.

It is to be understood, moreover, that the present invention is intended to include products formed in the manner described even though the outer layers may be composed entirely of the polymerized plastic. Such products may, for example, be produced when the process of the present invention is practiced with relatively large amounts of a monomer which is itself a swelling agent for the treated sheet and where the present invention is practiced under such conditions that the swelling of the treated sheet takes place slowly. An example of such a process would be the treatment of a sheet of cellulose acetate butyrate with methyl methacrylate monomer.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent is:

1. A plastic lens comprising predominantly material from the class consisting of the transparent celulosic plastics, the surfaces of said lens being coated with and the layers thereof immediately adjacent said surfaces having diffused therethrough a polymerized mixture of allyl methacrylate, methyl methacrylate and methacrylic acid.

2. A plastic lens comprising predominantly cellulose acetate, the surfaces of said lens having coated thereon and the portions thereof immediately adjacent said surfaces having incorporated therewith a polymerized mixture of allyl methacrylate, methyl methacrylate and methacrylic acid.

3. The process which comprises swelling cellulose acetate with a solution comprising allyl methacrylate monomer, methyl methacrylate monomer and methacrylic acid monomer, and heating said swelled cellulose acetate to polymerize so much of said solution as is absorbed therein.

4. The process which comprises swelling a sheet of cellulose acetate with a solution comprising allyl methacrylate monomer, methyl methacrylate monomer, and methacrylic acid monomer, placing said swelled sheet between glass plates, exerting pressure on said plates, and heating said sheet while said pressure is maintained to polymerize the solution absorbed therein.

5. The process which comprises swelling cellulose acetate with a mixture comprising approximately four parts by volume of allyl methacrylate monomer, four parts by volume of methyl methacrylate monomer, and one part by volume of methacrylic acid monomer, and heating said swelled cellulose acetate to polymerize so much of said mixture as is absorbed therein.

6. The process which comprises swelling a cellulosic plastic with a mixture comprising a polymerizable swelling agent from the class of compounds adapted to form addition polymers, the monomer of a methacrylate adapted when polymerized to form a three-dimensional polymer, and the monomer of a methacrylate adapted when polymerized to give a relatively flexible linear polymer which is substantially harder than the cellulosic plastic, and heating said swelled cellulosic plastic to polymerize so much of said mixture as is absorbed therein.

7. A plastic lens comprising predominantly cellulose acetate, the surfaces of said lens and the portions thereof immediately adjacent said surfaces having diffused therethrough a polymerized mixture of approximately four parts of allyl methacrylate, four parts of methyl methacrylate and one part of methacrylic acid.

8. The process which comprises swelling a sheet of cellulosic plastic with a solution comprising (1) a monomer from the class consisting of methacrylic acid, methyl vinyl ketone and methyl isopropenyl ketone, (2) methyl methacrylate monomer and (3) allyl methacrylate monomer, placing said swelled sheet between glass plates, exerting pressure on said plates and heating said sheet while said pressure is maintained to polymerize the solution absorbed therein.

DEXTER P. COOPER, Jr.

REFERENCES CITED

The following references are of record in the file of this patent:

UNITED STATES PATENTS

| Number | Name | Date |
|---|---|---|
| 2,252,091 | Muller | Aug. 12, 1941 |
| 2,087,795 | Chubb | July 20, 1937 |
| 2,005,426 | Land | June 18, 1935 |
| 2,044,579 | Kuettel | June 16, 1936 |
| 1,953,892 | Bender | Apr. 3, 1934 |
| 1,964,039 | Dreyfus | June 26, 1934 |
| 2,028,776 | Hibbert | Jan. 28, 1936 |
| 2,129,665 | Barrett et al. | Sept. 13, 1938 |
| 2,129,722 | Woodhouse | Sept. 13, 1938 |
| 2,185,018 | Sauer | Dec. 26, 1939 |
| 2,274,706 | Keim | Mar. 3, 1942 |
| 1,989,371 | Land | Jan. 29, 1935 |
| 2,263,249 | Rogers | Nov. 18, 1941 |
| 2,047,253 | Brooks | July 14, 1936 |
| 2,184,876 | Sherts | Dec. 26, 1939 |
| 2,316,274 | Mitchell | Apr. 13, 1943 |
| 2,320,533 | Muskat | June 1, 1943 |
| 2,322,310 | Muskat | June 22, 1943 |
| 2,233,941 | Fix | Mar. 4, 1941 |
| 2,280,055 | Andersen | Apr. 21, 1942 |

FOREIGN PATENTS

| Number | Country | Date |
|---|---|---|
| 482,836 | Great Britain | Apr. 5, 1938 |
| 490,381 | Great Britain | Aug. 15, 1938 |

OTHER REFERENCES

Ellis: "Chemistry of Synthetic Resins," pages 14 and 15.